(12) United States Patent
Romano et al.

(10) Patent No.: US 11,348,074 B2
(45) Date of Patent: *May 31, 2022

(54) BINDING SEPARATE COMMUNICATION PLATFORM MEETINGS

(71) Applicant: Microsoft Technology Licensing, LLC, Redmond, WA (US)

(72) Inventors: Anthony C Romano, Kirkland, WA (US); Ganesh Sridharan, Redmond, WA (US); Giridhar Kalpathy Narayanan, Redmond, WA (US); Robert W. Young, Kirkland, WA (US); Mattia Tocco, Redmond, WA (US); Deepak Rao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,628

(22) Filed: May 26, 2020

(65) Prior Publication Data

US 2020/0286043 A1 Sep. 10, 2020

Related U.S. Application Data

(63) Continuation of application No. 16/043,753, filed on Jul. 24, 2018, now Pat. No. 10,699,250, which is a
(Continued)

(51) Int. Cl.
  *G06Q 10/10* (2012.01)
  *H04N 7/14* (2006.01)
  (Continued)

(52) U.S. Cl.
  CPC ....... *G06Q 10/1095* (2013.01); *H04L 65/403* (2013.01); *H04N 7/147* (2013.01); *H04N 7/152* (2013.01)

(58) Field of Classification Search
  CPC .. G06Q 10/1095; H04L 65/403; H04N 7/147; H04N 7/152; H04M 3/56–569; H04M 2203/50–509
  (Continued)

(56) References Cited

U.S. PATENT DOCUMENTS

| | | | | |
|---|---|---|---|---|
| 5,373,549 | A | * | 12/1994 | Bales ...................... H04M 3/56 348/E7.084 |
| 5,973,724 | A | * | 10/1999 | Riddle ................ H04L 12/1822 348/14.07 |

(Continued)

OTHER PUBLICATIONS

"Any-to-Any Video Conferencing", [Online] Retrieved from the internet: <https://www.pexip.com/any-any-video-conferencing>, 3 pgs.

(Continued)

*Primary Examiner* — Hemant S Patel
(74) *Attorney, Agent, or Firm* — Schwegman Lundberg & Woessner, P.A.

(57) ABSTRACT

A join service joins first and second computerized meetings. The join service receives information about the first and second computerized meetings from respective first and second meeting services. In response to a request from one of the first and second services to join the meetings, the join service translates audio, video, and data signaling between the first computerized meeting service and the second computerized meeting to join participants in the first computerized meeting and participants in the second meeting in a combined computerized meeting. An alternative join service obtains a uniform resource indicator (URI) for an agent of the first meeting. In response to a request from a participant in the second meeting to access the first meeting, the join (Continued)

service provides the URI to the second meeting service to allow the second meeting service to join the second meeting to the first meeting.

20 Claims, 9 Drawing Sheets

Related U.S. Application Data continuation of application No. 15/295,803, filed on Oct. 17, 2016, now Pat. No. 10,038,876.

(51) Int. Cl.
*H04N 7/15* (2006.01)
*H04L 65/403* (2022.01)

(58) Field of Classification Search
USPC .... 348/14.01–14.16, 14.08; 39/202.1–207.1; 379/202.1–207.1
See application file for complete search history.

(56) References Cited

U.S. PATENT DOCUMENTS

| | | | |
|---|---|---|---|
| 9,300,705 | B2 | 3/2016 | Periyannan et al. |
| 10,038,876 | B2 | 7/2018 | Romano et al. |
| 10,699,250 | B2* | 6/2020 | Romano ............ G06Q 10/1095 |
| 2004/0119814 | A1 | 6/2004 | Clisham et al. |
| 2008/0069011 | A1 | 3/2008 | Sekaran et al. |
| 2013/0106989 | A1 | 5/2013 | Gage et al. |
| 2013/0238729 | A1 | 9/2013 | Holzman et al. |
| 2014/0033067 | A1 | 1/2014 | Pittenger et al. |
| 2015/0154521 | A1* | 6/2015 | Mu .................... H04L 12/1818 705/7.12 |
| 2017/0150101 | A1* | 5/2017 | Liao ...................... H04N 7/152 |
| 2018/0109757 | A1 | 4/2018 | Romano et al. |
| 2018/0330337 | A1 | 11/2018 | Romano et al. |

OTHER PUBLICATIONS

"Cisco TelePresence Interoperability", [Online] Retrieved from the internet: <http://www. cisco.com/c/en/us/products/collateral/collaboration-endpoints/telepresence-system-3000-series/prod_qas0900aecd80717 ceO .html>, (May 16, 2014), 3 pgs.

"Cisco, Polycom, Vidyo, Lifesize . . . Yes, it's Skype to anything Video Conferencing", [Online] Retrieved from the internet:/<http://www.videocentric.co.uklskype-cisco-video-conferencing >, (Dec. 15, 2014), 5 pgs.

"Increasing Video Adoption in Multi-Vendor Video Environments: How to Integrate Skype for Business (Formerly Lyne) and Non-Skype For Business Video Experiences", In Whitepaper of Polycom, 4 pgs.

"Multi Device Collaboration Solutions", [Online] Retrieved from the internet: <https://www.bluejeans.com/video-collaboration/multi-device-collaboration-solutions>, 5 pgs.

"Vidyo Breaks Cost Barriers for Multi-Vendor, Multi-Device Video Conferencing Interoperability with Microsoft Lyne", [Online] Retrieved from the internet: <http://www.vidyo.com/company/news-and-events/press-releases/vidyo-breaks-cost-barriers-for-multi-vendor-multi-device-video-conferencing-interoperability-with-microsofl-lync/>, (Jun. 13, 2012), 4 pgs.

"WebEx Meeting Center with Collaboration Meeting Rooms (CMR Cloud) User Guide 3.0", [Online] Retrieved from the internet: <http://www.cisco.com/c/dam/en/us/products/collateral/conferencing/webex-meeting-center/cmr-cloud-user-guide.pdf>, (Aug. 1, 2014), 28 pgs.

Ho, et al., "A Conference Gateway Supporting Interoperability between SIP and H.323", In Proceedings of the ninth ACM international conference on Multimedia,, (Oct. 1, 2001), 10 pgs.

Shaofeng, et al., "A Multi-Tenant Framework for Multimedia Conference System", In Proceedings of 8th International Conference on Communications and Networking in China, (Aug. 14, 2013), 5 pgs.

* cited by examiner

US 11,348,074 B2

BINDING SEPARATE COMMUNICATION PLATFORM MEETINGS

CROSS-REFERENCE TO RELATED APPLICATION

This application is a continuation application of and claims the benefit of priority to U.S. patent application Ser. No. 16/043,753, filed on Jul. 24, 2018 which is a continuation application and claims benefit of priority to U.S. patent application Ser. No. 15/295,803, now U.S. Pat. No. 10,038,876, filed on Oct. 17, 2016. The disclosures of these applications are hereby incorporated by reference in their entirety.

BACKGROUND

Video conference systems provide a much needed functionality to users. Participants across the globe can hold meetings face-to-face, share data, make presentations, etc. without the need for multiple people to travel long distances. While video conference systems typically provide reliable and satisfactory experience to users, many such systems require sophisticated and expensive equipment. Also referred to as video telecommunication devices (VTCs), video conference systems are typically a closed system within a communication system. They may operate on standard protocols for signaling and audio/video, but may still have a large degree of variances with signaling.

On the other hand, multimodal, online communication applications such as Skype® and Skype For Business® by MICROSOFT CORPORATION of Redmond, Wash., provide a much more reasonable (in terms of complication and cost) alternative to complex video conference systems. However, online communication applications are typically directed to a user experience that involves the user's computer display and its peripherals, thus, not lending themselves to conference room type environments.

SUMMARY

This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

According to a first aspect, a join service joins a first meeting hosted by a first computerized meeting service and having a first plurality of participants to a second meeting hosted by a second computerized meeting service and having a second plurality of participants. The join service obtains information identifying the first and second meetings and, in response to a request from one of the first and second computerized meeting services to join the first and second meetings, translates audio, video, and data signaling between the first computerized meeting service and the second computerized meeting to join the first plurality of participants and the second plurality of participants in a combined computerized meeting.

According to a second aspect, the join service obtains first metadata identifying a first protocol used by the first meeting for audio, video, and data signaling and second metadata identifying a second protocol used by the second meeting for audio, video, and data signaling. The join service obtains first and second agents, the first agent implementing the first protocol and the second agent implementing the second protocol. The first and second agents are configured to translate audio, video and data signaling according to the first and second protocols to join the first and second meetings.

According to a third aspect, the join service obtains a uniform resource indicator (URI) for an agent of the first meeting on the first computerized meeting service. In response to a request from one of the second plurality of participants to access the first meeting, the join service provides the URI to the second computerized meeting service to allow the second computerized meeting service to join the second meeting to the first meeting and to join the first plurality of participants and the second plurality of participants in a joint meeting.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description when considered in conjunction with the drawings.

DETAILED DESCRIPTION

Figure 1:
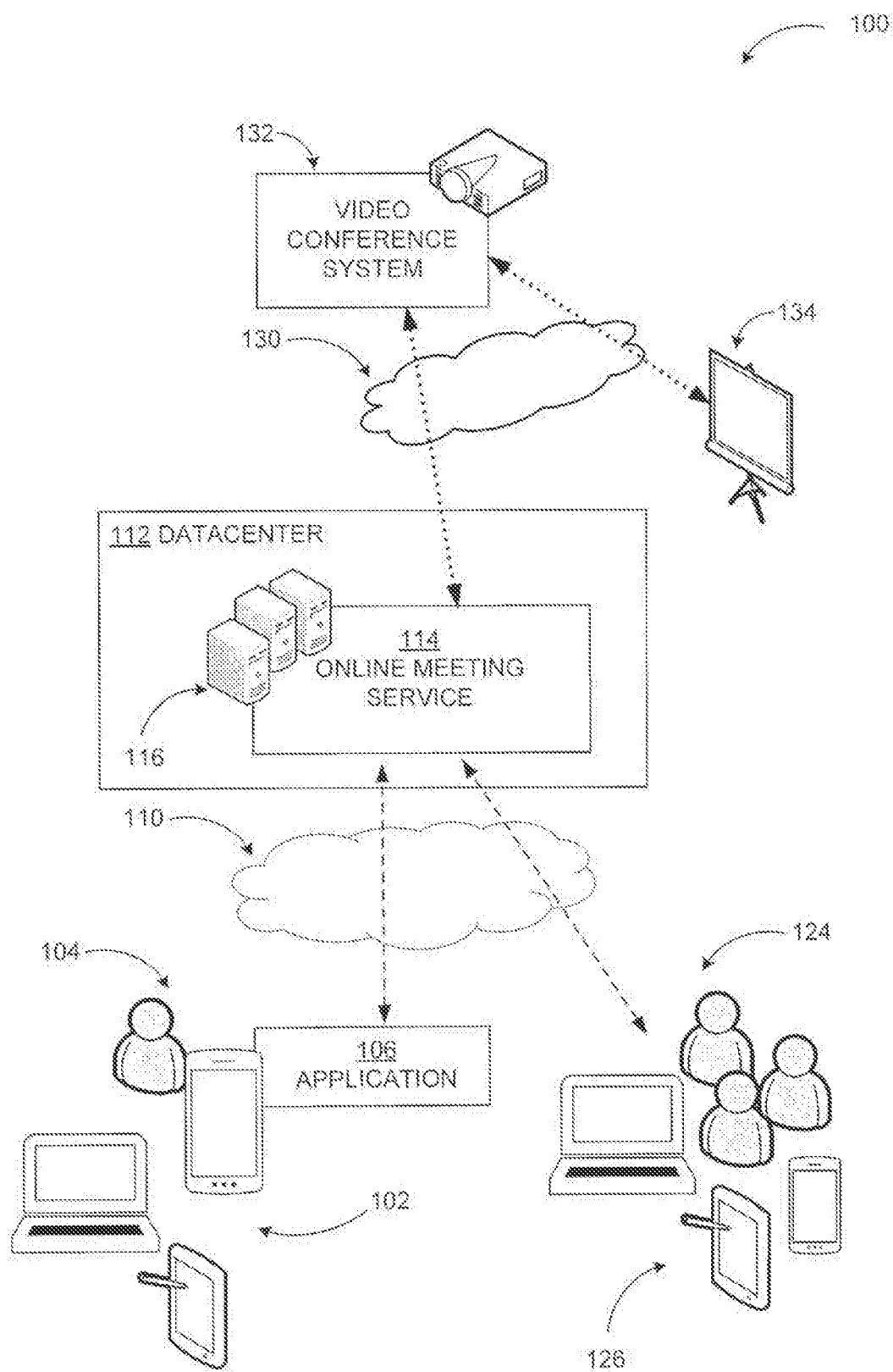
FIG. 1 includes an example network environment where an online meeting service with binding capability for separate communication platform meetings may be implemented.

As briefly described above, embodiments are directed to video conference service interconnection with an online meeting service. The online meeting service may provision a video conference component for its meetings by providing a tenant identifier to the video conference service. A key created by the video conference service based on the tenant identifier may be received and used to create a video conference component link in scheduled online meetings. The key and a conference identifier identifying a particular scheduled meeting may be inserted into a meeting body. At meeting time, the link may be used to connect to the video conference service and inform the video conference service which online meeting to join, thus allowing users to access the same meeting through an online meeting component or a video conference component.

An online meeting as used herein refers to a meeting with multiple modalities such as audio, video, messaging, application sharing, desktop sharing, and similar ones. Online meetings are typically conducted through various physical computing devices that may be general purposes devices such as laptop computers, desktop computers, handheld computers, and so on. While some online meeting services may include specialized devices such as meeting room devices, an online meeting typically does not require or involve specialized devices and may be facilitated through communication between servers and client devices as discussed above. In contrast, a video conference meeting typically involves specialized devices and systems such as special cameras, projectors, audio/video devices, etc. Furthermore, communication protocols, processing of meeting data, and other aspects of the two meeting services may also be distinct.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing online meeting services with interconnectivity to video conference systems. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where an online meeting service with binding capability for separate communication platform meetings may be implemented.

As illustrated in diagram 100, an example system may include a datacenter 112 hosting a cloud-based online meeting service 114 configured to facilitate multimodal online meetings including, but not limited to, audio, video, desktop sharing, application sharing, messaging, and similar ones. In some examples, the online meeting service may be part of another service such as a productivity service providing additional services such as productivity applications, collaboration applications, and others. The services may be accessed across multiple devices and users. The datacenter 112 may include one or more processing servers 116 configured to execute the online meeting service 114, among other components. In some embodiments, at least one of the processing servers 116 may be operable to manage the online meeting service 114, where data associated with the meetings and participants may be stored at storage servers 120 (or associated data stores). As described herein, the online meeting service 114 may be implemented as software, hardware, or combinations thereof.

In some embodiments, the online meeting service 114 may be configured to interoperate with various applications to provide the specific services. For example, as illustrated in the diagram 100, a user 104 may execute a thin (e.g., a web browser) or a thick (e.g., a locally installed client application) version of an application 106 through the device 102 with which the online meeting service 114 may be configured to integrate and interoperate with over one or more networks, such as network 110. The application 106 may be an application hosted by the online meeting service, for example, and facilitate online meetings between user 104 and other users 124 through respective devices 102 and 126. The device 102 may include a desktop computer, a laptop computer, a tablet computer, a vehicle mount computer, a smart phone, or a wearable computing device, among other similar devices. A communication interface may facilitate communication between the online meeting service 114 and the application 106 over the network 110.

The online meeting service 114 may provide a tenant identifier to a video conference service 132 over a network 130 in some embodiments to facilitate interconnectivity with the video conference service 132. The video conference service 132 may have other components such as servers, special purpose devices, and display devices (e.g., display device 134). The identifier may be associated with the tenant (e.g., online meeting service) and used to create a key that is used by the video conference service to schedule and initiate meetings. The online meeting service may also include the key in metadata used by its scheduling service. The tenant identifier and/or the key may be used by the components involved in initiating and facilitating various meetings by users of the online meetings.

The tenant identifier and the key may be an alphanumeric strings that may or may not be hashed or otherwise modified during exchanges between the online meeting service and the video conference service. Metadata for meetings may include information associated with a scheduling, establishment, facilitation, and formatting of meetings. For example, the metadata may define whether or not a meeting includes a video conference component, which modalities a meeting can include, any restrictions such as permissions, network condition based options, and any other meeting related information. Meeting attributes may be a subset of the metadata indicating type of meeting and how different components (that is online meeting component and video conference component) are to be joined. A meeting that is scheduled and facilitated solely by the online meeting service may be defined as having only an online meeting component (although the meeting may still have multiple modalities such as audio, video, desktop sharing, etc.). A meeting, where some users can join via a video conference service and others via the online meeting service may be defined as having an online meeting component and a video conference component. In some example implementations, a join service may manage the physical translation of signals to facilitate seamless interaction between the two components.

The technical advantages of providing binding of separate communication platform meetings may include, among others, increased security and efficiency online meetings (direct connection between separate systems), reduced processing and network bandwidth usage (direct connection instead of multiple connections and intermediary services/devices), and improved user interaction by allowing users to join an online meeting via a video conference service or an online meeting service.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users participating in online meetings and video conferences.

Figure 2:
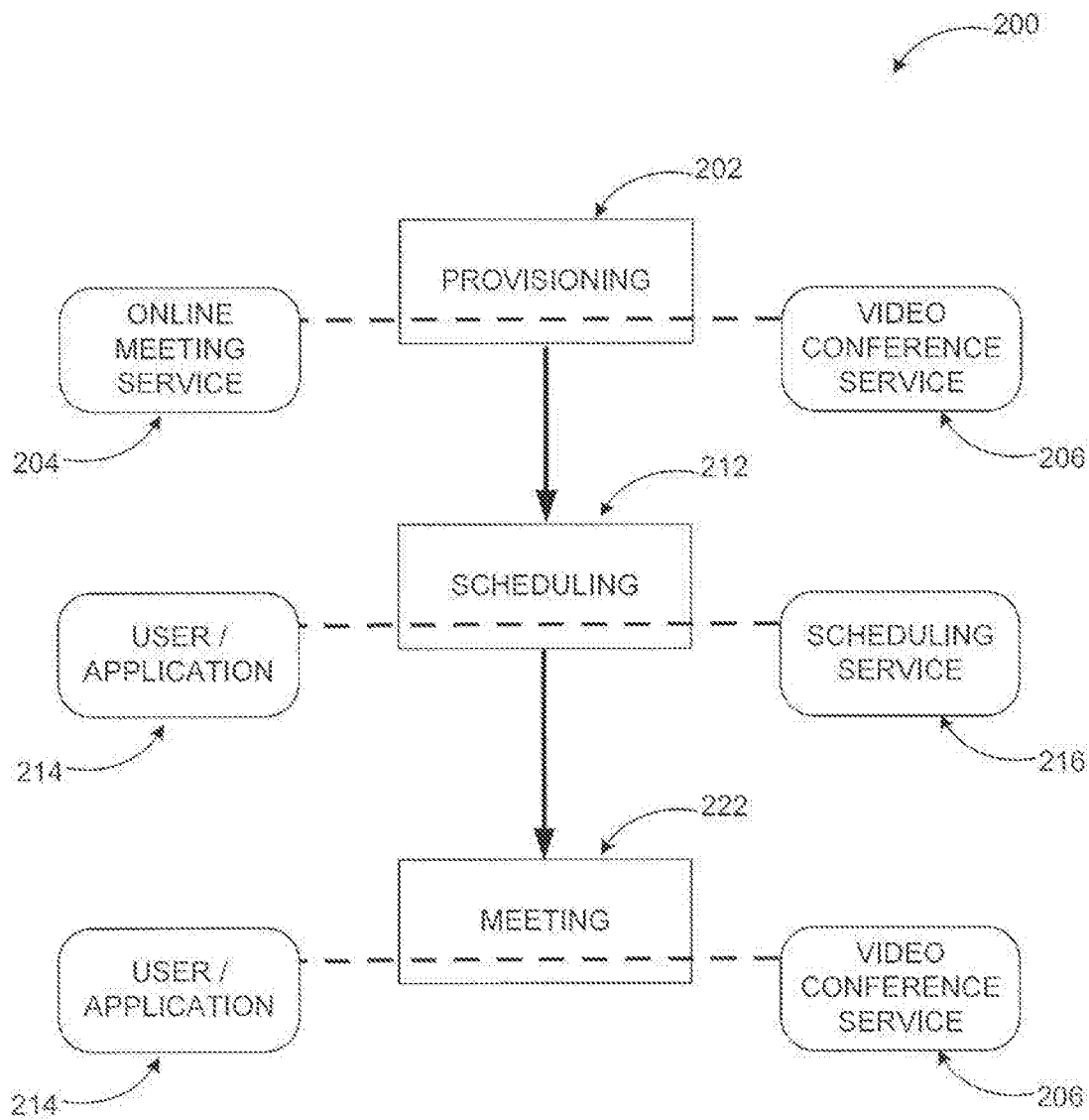
FIG. 2 illustrates conceptually example phases of operation in a joined online meeting service-video conference system meeting.

FIG. 2 illustrates conceptually example phases of operation in a joined online meeting service-video conference system meeting.

As shown in diagram 200, interconnectivity of online meeting services and video conference services may include a number of phases. In some examples, a provisioning phase 202 may include the online meeting service 204 and the video conference service 206 exchanging information to facilitate joined meetings. A tenant identifier that uniquely identifies the tenant (the online meeting service or its umbrella service such as productivity service) may be shared and a key identifying a set of properties may be created based on the tenant identifier. The key may be used for creating links to a video conference component for individual meetings, thereby associating the tenant and meetings to the video conference service.

At a scheduling phase 212, a user through an online meeting application 214 or a module of the online meeting service (e.g., a web module) and a scheduling service 216, which may be a component of the online meeting service 204, may include a link in a meeting body for one or more upcoming (scheduled) meetings based on the key and associated information. The link may allow a user to access the video conference component at the time of the meeting. The meeting body, also called an "invite" refers to a calendar item created to remind users about the meeting along with meeting information such as list of attendees, any physical locations associated with the meeting, date and time of the meeting, as well as, links and/or instructions to join the meeting via an online meeting component, a phone call, or a video conference component.

At a meeting phase 222, the user through the online meeting application 214 or the module of the online meeting service may initiate and facilitate meetings with the video conference service 206 using conference identifiers and/or resource identifiers (such as URL or URI) created based on the tenant identifier and the key.

Figure 3:
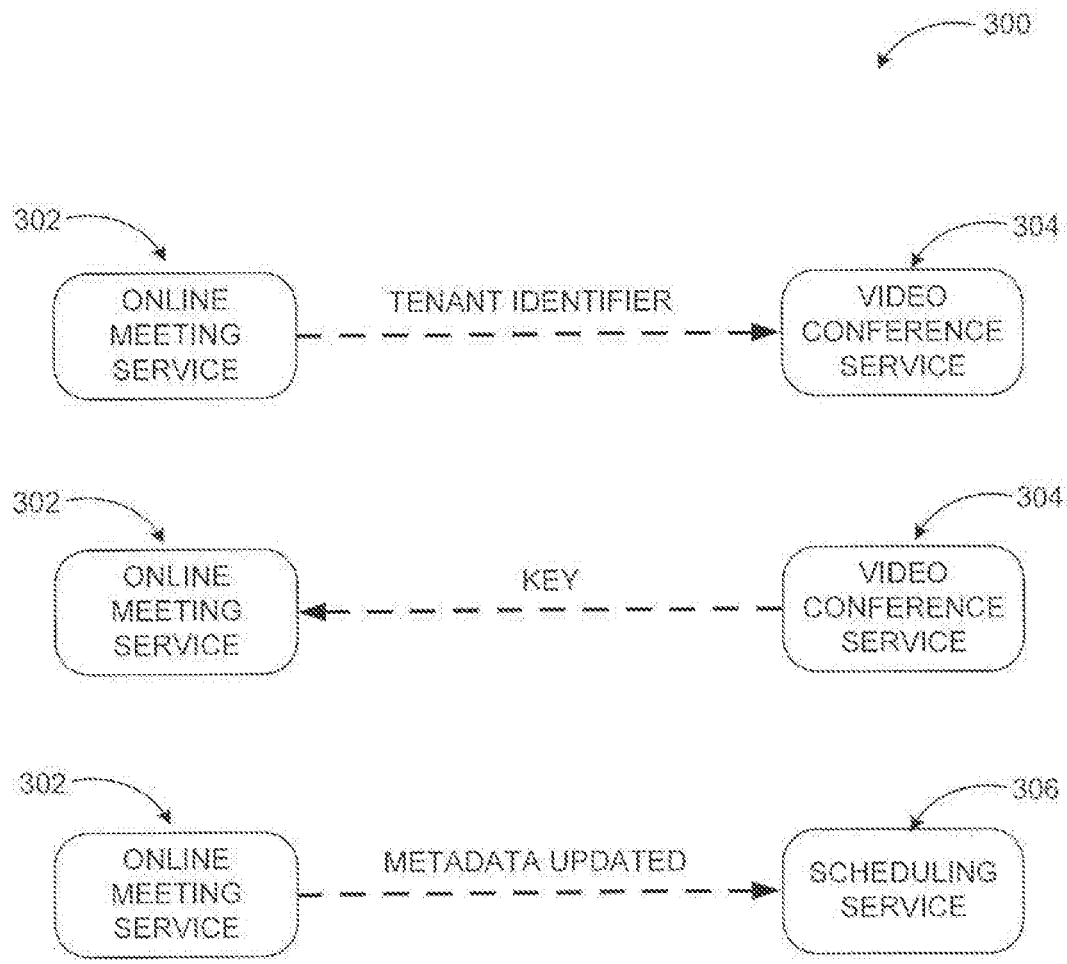
FIG. 3 illustrates a set of example call flows between components of a system for binding separate communication platform meetings.

FIG. 3 illustrates a set of example call flows between components of a system for binding separate communication platform meetings.

In a provisioning phase shown in diagram 300, online meeting service 302 may send its tenant identifier to the video conference service 304 in addition to any other pertinent service related information. The video conference service 304 may associate a key value with the tenant identifier (thereby with the online meeting service) and store the key value in a persistent manner, for example, during the lifetime of a license with the video conference service. Thus, the same tenant identifier/key pair may be used for multiple meetings. The key may be returned to online meeting service 302.

The online meeting service 302 may provision a scheduling service 306 by sending updated metadata indicating video conference interconnectivity is enabled and the key. The scheduling service 306 may be executed on a conference state server (as part of the online meeting service 302 or as a separate third party service) and may include a number of session initiation protocol (SIP) user agents that are addressable by using a conference uniform resource identifier (URI). The scheduling service 306 may be responsible for the following tasks: initiating conferences, enlisting required conferencing servers, authenticating participants before allowing them to enter a conference, enforcing one or more policies, maintaining SIP signaling relationships between conference participants and conferencing servers, managing conference state, and accepting subscription to conferences and notifying users of changes in conference state, such as the arrival and departure of participants and the addition or removal of media.

Figure 4:
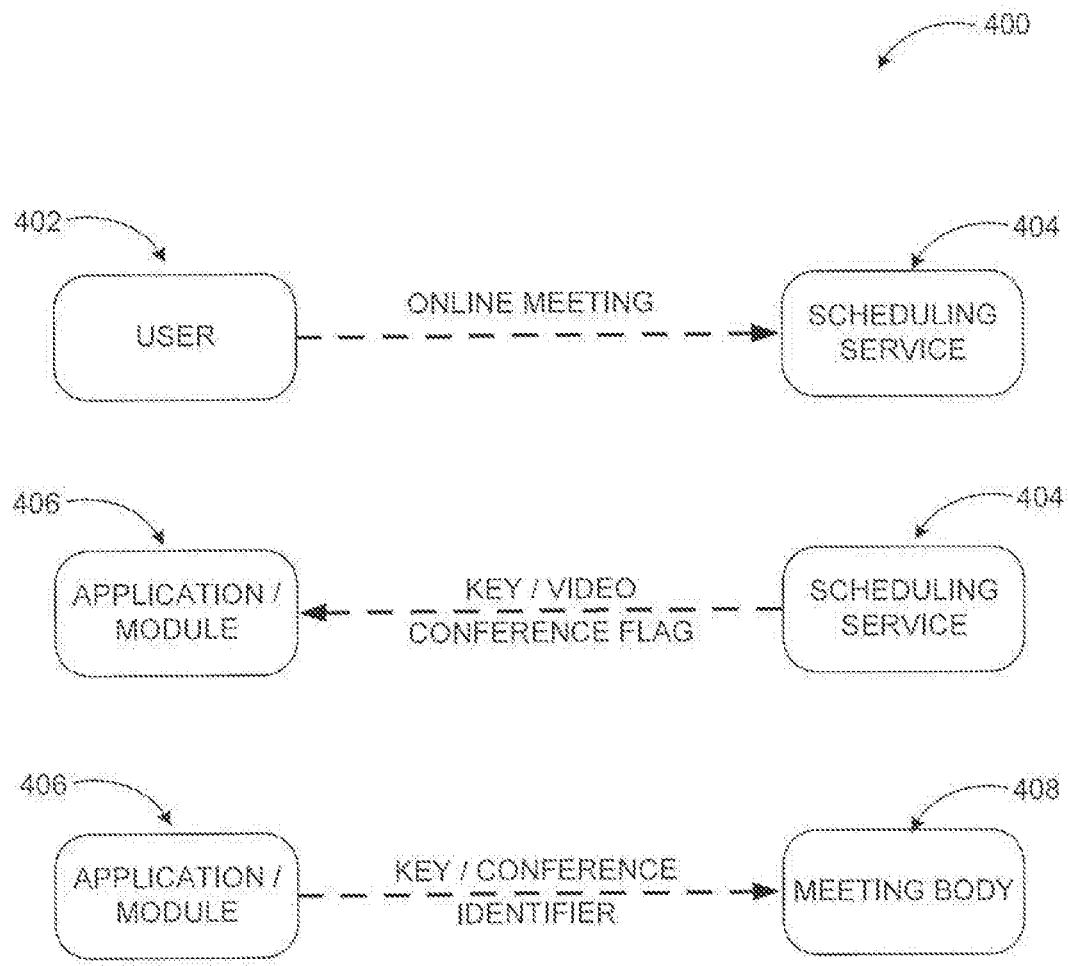
FIG. 4 illustrates another set of example call flows between components of a system for binding separate communication platform meetings.

FIG. 4 illustrates another set of example call flows between components of a system for binding separate communication platform meetings.

In a scheduling phase as shown in diagram 400, a user 402 may schedule an online meeting with the scheduling service 404 using their local application, a module of the online meeting service, or a web application of the online meeting service. The scheduling service 404 may provide the key bound to the tenant (online meeting service) to the user's application or module 406 in addition to any other meetings. The scheduling service 404 may also mark the meeting as video conference enabled meeting. The application or module 406 may format the video conference attributes according to its specification (to match the online meeting) and add to other meeting information including the key and conference identifier. The application or module 406 may then format the meeting body 408 for user consumption (join the meeting).

Figure 5:
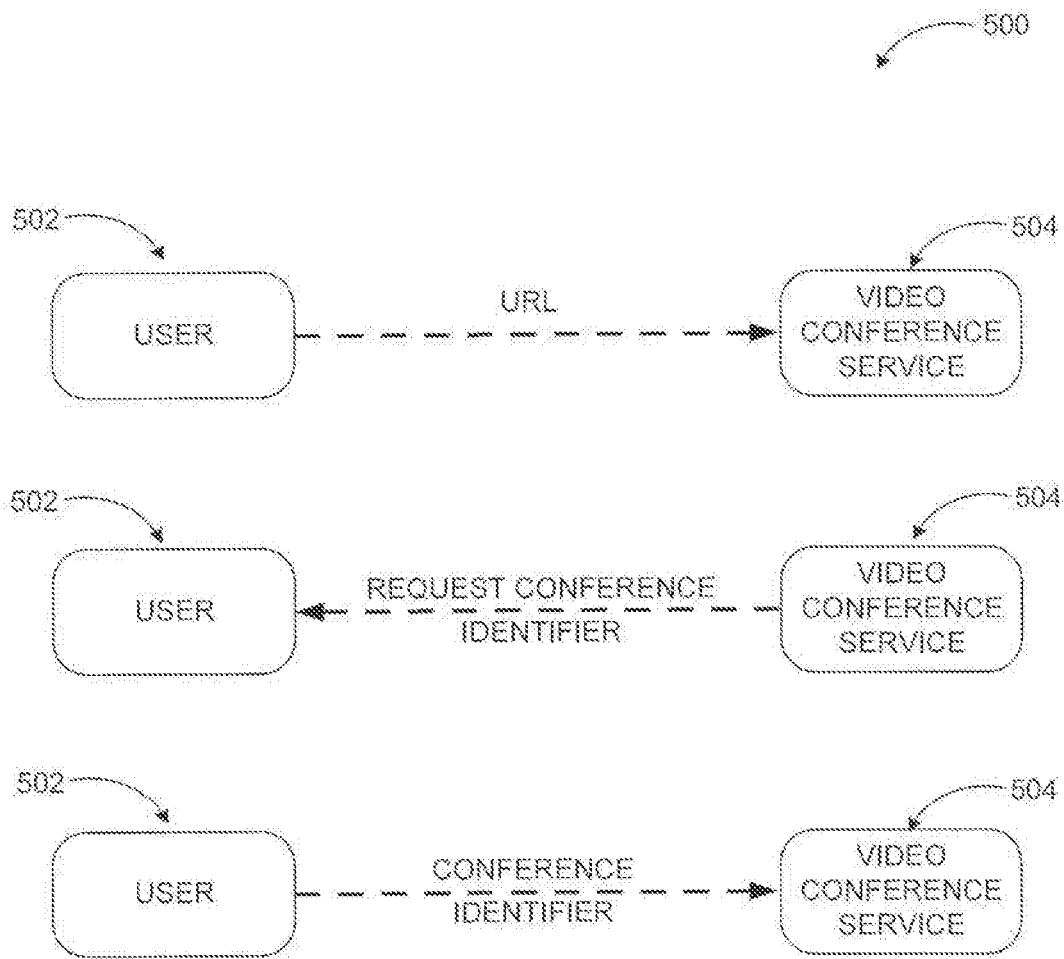
FIG. 5 illustrates a further set of example call flows between components of a system for binding separate communication platform meetings.

FIG. 5 illustrates a further set of example call flows between components of a system for binding separate communication platform meetings.

In a first part of meeting phase (initiation of a meeting) shown in diagram 500, a user 502 may initiate a meeting by calling the URL provided in a video conference section of the meeting body. The URL may include the key as part of a SIP address. In response, the video conference service 504 may request the conference identifier from the user 502. The user 502 may provide the conference identifier, which identifies the meeting with the tenant (online meeting service). In some examples, the conference identifier may be automatically provided based on the metadata associated with the meeting.

The tenant identifier based key portion of the SIP address and the conference identifier combined may be sufficient to complete the meetings for a joint meeting between the online meeting service and the video conference service. The tenant identifier based key portion of the SIP address and the conference identifier may also be referred to as a pair.

Figure 6:
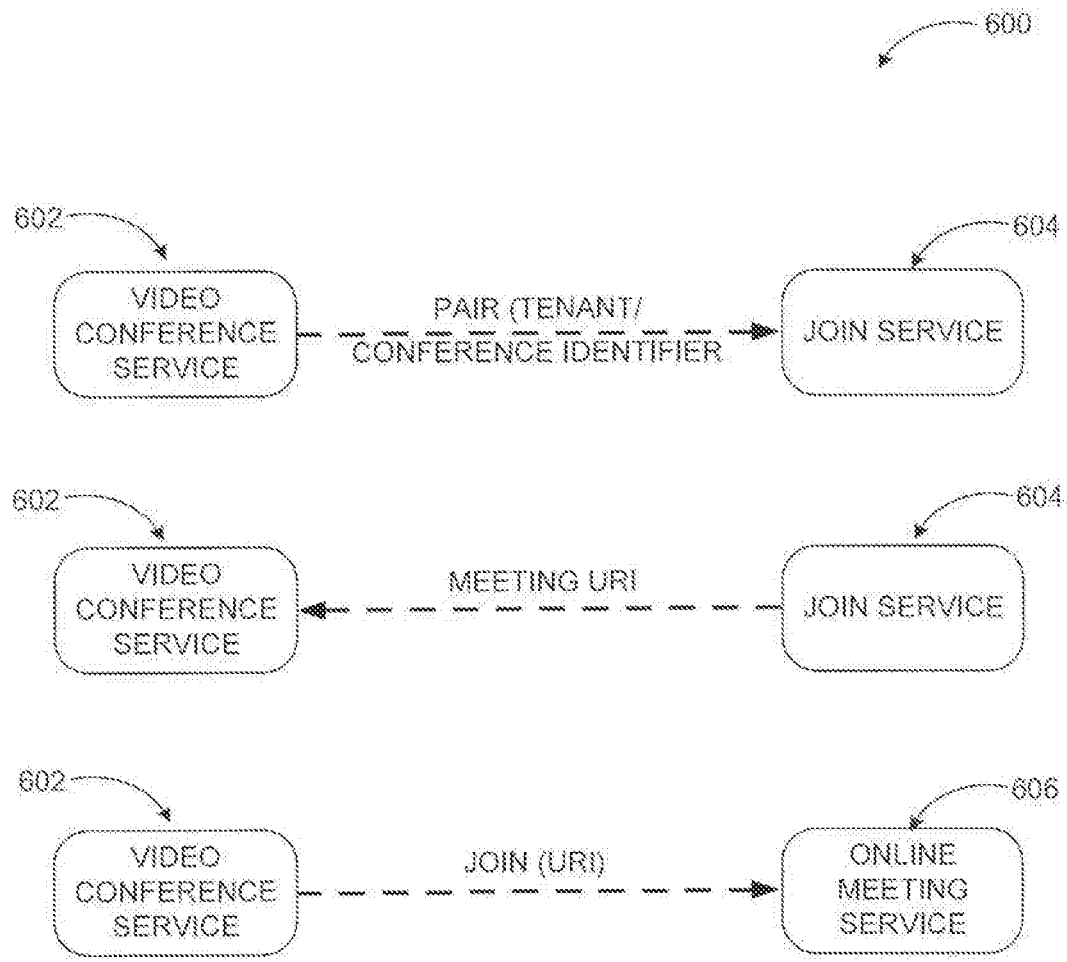
FIG. 6 illustrates yet another set of example call flows between components of a system for binding separate communication platform meetings.

FIG. 6 illustrates yet another set of example call flows between components of a system for binding separate communication platform meetings.

In a second part of meeting phase shown in diagram 600, the video conference service 602 may attempt to resolve the pair to obtain a meeting URI. The tenant may be obtained from a value from a key lookup at a join service 604. The join service 604 may provide the meeting URI obtained from the pair to the video conference service 602. The video conference service 602 may then try to join the meeting via the URI by contacting one of the user agents of the online meeting service 606.

The examples provided in FIGS. 1 through 6 are illustrated with specific systems, services, applications, modules, codes, and notifications. Embodiments are not limited to environments according to these examples. Binding separate communication platform meetings may be implemented in environments employing fewer or additional systems, services, applications, engines, codes, and user experience configurations. Furthermore, the example systems, services, applications, modules, and notifications shown in FIG. 1 through 6 may be implemented in a similar manner with other values using the principles described herein.

Furthermore, alternative embodiments may employ comparable constructs instead of a tenant identifier or a key to associate online meetings with video conference components with a particular service (or tenant). Moreover, the information (such as conference identifier, the key, the links, etc.) may be provided as part of the metadata of a meeting instead of visible elements in the meeting body, as non-textual elements such as actionable images or graphics, or in comparable forms. The components of an online meeting service and/or a video conference service discussed herein may be combined or separate into multiple modules or agents that can perform specified tasks.

Figure 7:
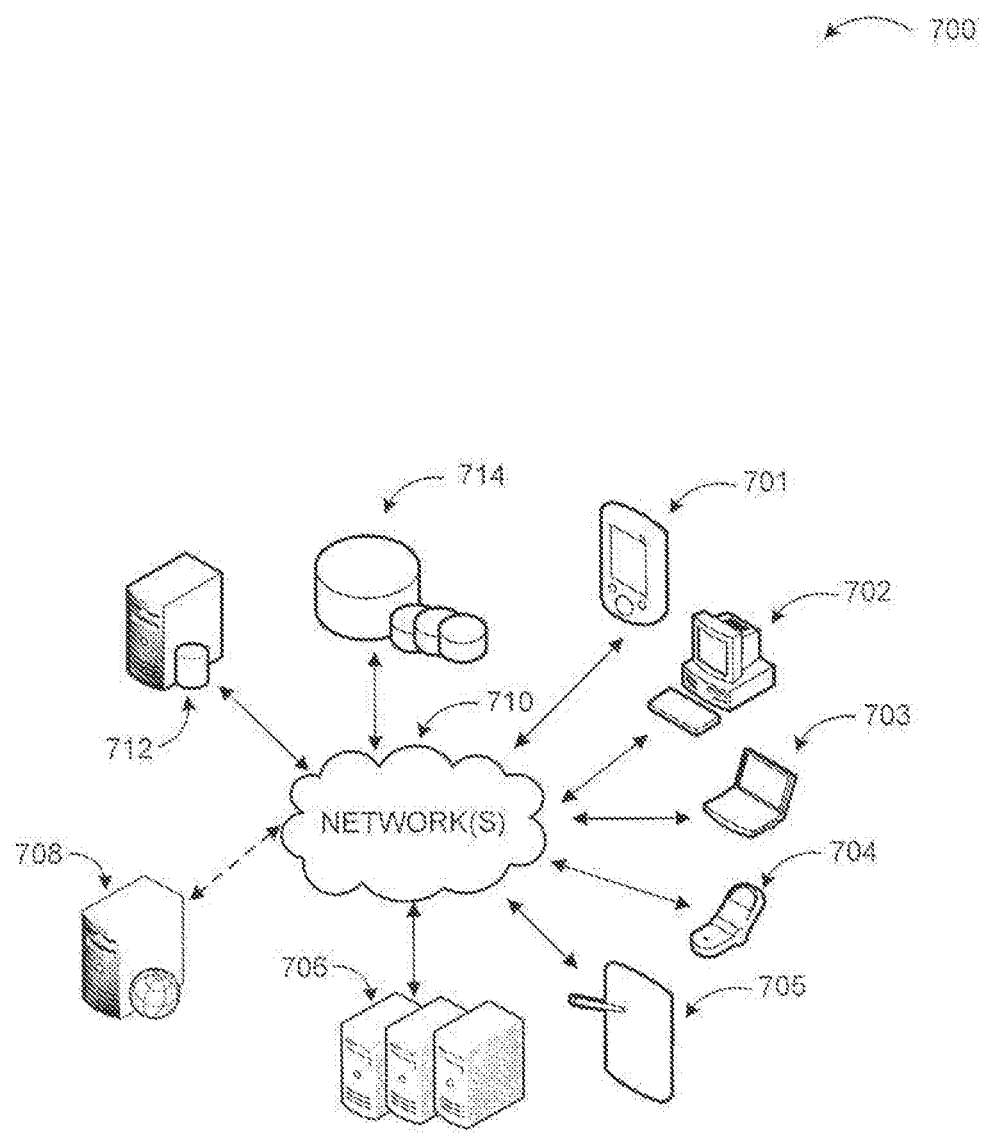
FIG. 7 is a networked environment, where a system according to embodiments may be implemented.

FIG. 7 is a networked environment, where a system according to embodiments may be implemented. In addition to locally installed applications (for example, application 107), binding of separate communication platform meetings may also be employed in conjunction with hosted applications and services (for example, a service 114) that may be implemented via software executed over one or more servers 706, individual server 708, or at client devices, as illustrated in diagram 700. A hosted service or application may communicate with client applications on individual computing devices such as a handheld computer 701, a desktop computer 702, a laptop computer 703, a smart phone 704, a tablet computer (or slate), 705 ('client devices') through network(s) 710 and control a user interface presented to users.

Client devices 701-705 are used to access the functionality provided by the hosted service or application. One or more of the servers 706 or server 708 may be used to provide a variety of services as discussed above. Relevant data such as meeting data may be stored in one or more data stores (e.g. data store 714), which may be managed by any one of the servers 706 or by database server 712.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the Internet. Network(s) 710 may also coordinate communication over other networks such as PSTN or cellular networks. Network(s) 710 provides communication between the nodes described herein. By way of example, and not limitation, network(s) 710 may include wireless media such as acoustic, RF, infrared and other wireless media.

Many other configurations of computing devices, applications, engines, data sources, and data distribution systems may be employed for binding of separate communication platform meetings. Furthermore, the networked environments discussed in FIG. 7 are for illustration purposes only. Embodiments are not limited to the example applications, engines, or processes.

Figure 8:
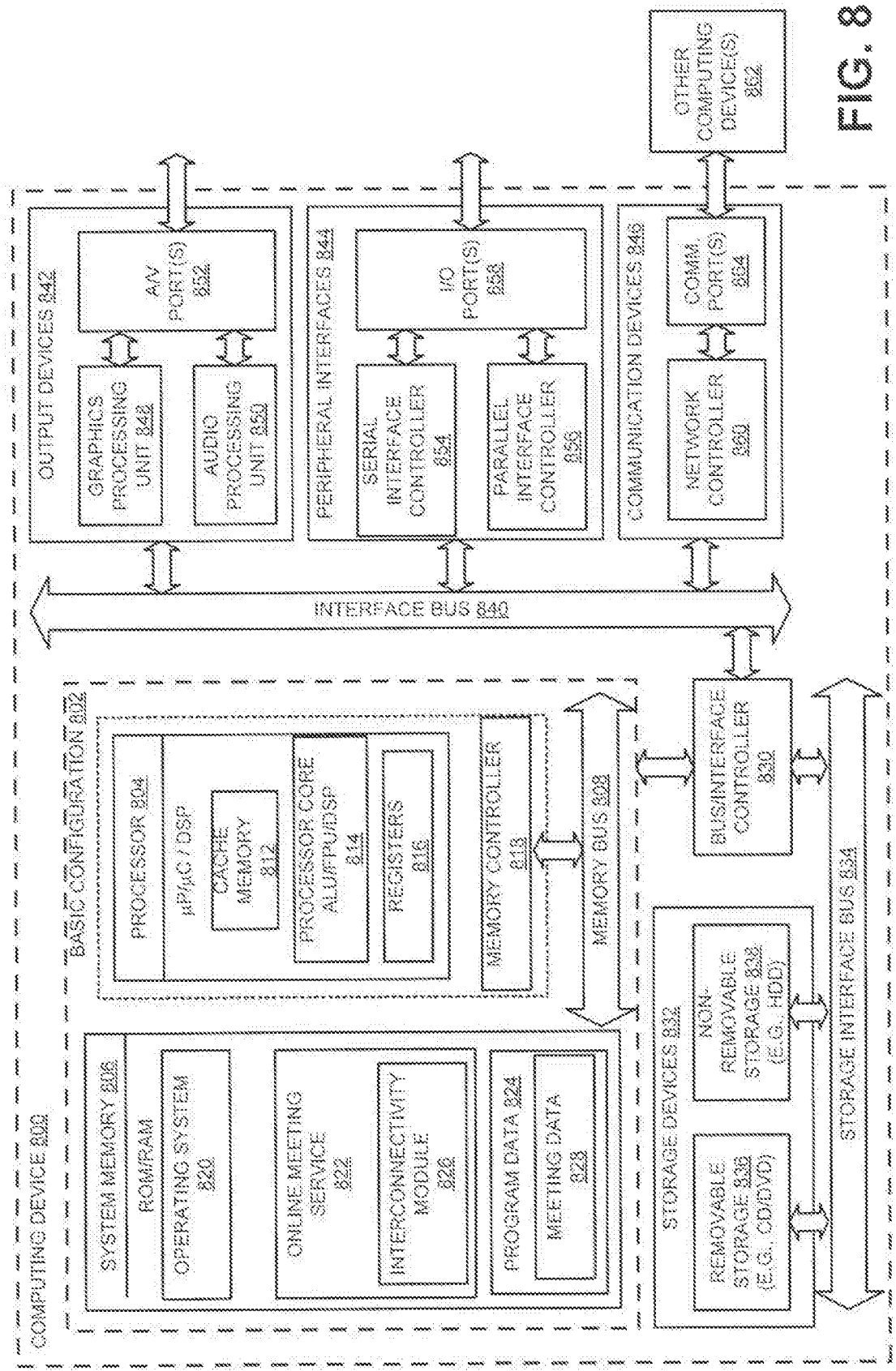
FIG. 8 is a block diagram of an example general purpose computing device, which may be used to provide binding of separate communication platform meetings.

FIG. 8 is a block diagram of an example general purpose computing device, which may be used to provide binding of separate communication platform meetings.

For example, computing device 800 may be used as a server, desktop computer, portable computer, smart phone, special purpose computer, or similar device. In an example basic configuration 802, the computing device 800 may include one or more processors 804 and a system memory 806. A memory bus 808 may be used for communicating between the processor 804 and the system memory 806. The basic configuration 802 is illustrated in FIG. 8 by those components within the inner dashed line.

Depending on the desired configuration, the processor 804 may be of any type, including but not limited to a microprocessor (µP), a microcontroller (µC), a digital signal processor (DSP), or any combination thereof. The processor 804 may include one more levels of caching, such as a level cache memory 812, one or more processor cores 814, and registers 816. The example processor cores 814 may (each) include an arithmetic logic unit (ALU), a floating point unit (FPU), a digital signal processing core (DSP Core), or any combination thereof. An example memory controller 818 may also be used with the processor 804, or in some implementations the memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, an online meeting service 822, and program data 824. The online meeting service 822 may include an interconnectivity module 826, which may manage interconnectivity with video conference systems by binding separate communication platform meetings. The program data 824 may include, among other data, meeting data 828, as described herein.

The computing device 800 may have additional features or functionality, and additional interfaces to facilitate communications between the basic configuration 802 and any desired devices and interfaces. For example, a bus/interface controller 830 may be used to facilitate communications between the basic configuration 802 and one or more data storage devices 832 via a storage interface bus 834. The data storage devices 832 may be one or more removable storage devices 836, one or more non-removable storage devices 838, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (for example, one or more output devices 842, one or more peripheral interfaces 844, and one or more communication devices 846) to the basic configuration 802 via the bus/interface controller 830. Some of the example output devices 842 include a graphics processing unit 848 and an audio processing unit 850, which may be configured to communicate to various external devices such as a display or speakers via one or more A/V ports 852. One or more example peripheral interfaces 844 may include a serial interface controller 854 or a parallel interface controller 856, which may be configured to communicate with external devices such as input devices (for example, keyboard, mouse, pen, voice input device, touch input device, etc.) or other peripheral devices (for example, printer, scanner, etc.) via one or more I/O ports 858. An example communication device 846 includes a network controller 860, which may be arranged to facilitate communications with one or more other computing devices 862 over a network communication link via one or more communication ports 864. The one or more other computing devices 862 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a part of a general purpose or specialized server, mainframe, or similar computer that includes any of the above functions. The computing device 800 may also be implemented as a personal computer including both laptop computer and non-laptop computer configurations.

Example embodiments may also include methods to provide binding of separate communication platform meetings. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 9:
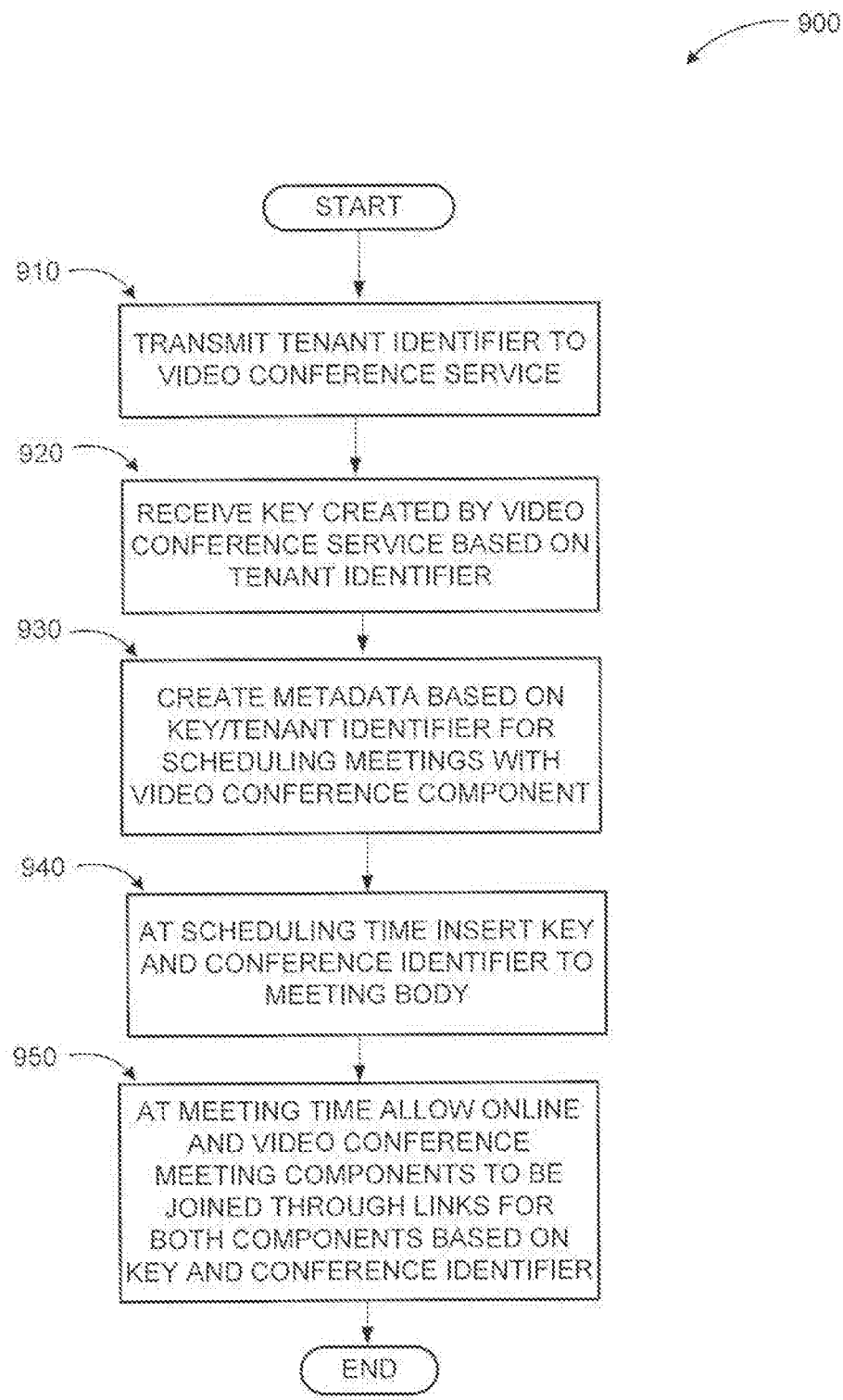
FIG. 9 illustrates a logic flow diagram of a method to provide binding of separate communication platform meetings.

FIG. 9 illustrates a logic flow diagram of a method to provide binding of separate communication platform meetings.

Process 900 may be implemented on a computing device, server, or other system. An example system may include a computer communicatively coupled to a cloud server hosting one or more components of an online meeting service including an interconnectivity module.

Process 900 begins with operation 910, where a tenant identifier may be transmitted by an online meeting service to a video conference service during a provisioning phase. The tenant identifier may identify the online meeting service or one of its components. At operation 920, the online meeting service may receive a key created by the video conference service based on the tenant identifier. The key may be stored and used persistently to schedule and facilitate meetings that include both of the online meeting service and the video conference service. In some embodiments, a distributed dictionary may be used to bind the key with the tenant identifier.

At operation 930, the online meeting service may create metadata for scheduling meetings based on the key and the tenant identifier, where the metadata may be used subsequently to bind online meeting component and video conference component of meetings. At operation 940, the key and a conference identifier identifying a particular meeting being scheduled may be inserted into a meeting body (or comparably included in the meeting item) at scheduling time.

At operation 950, online meeting and video conference meeting components of the scheduled meeting may be joined through one or more links provided in the meeting body based on the key and the conference identifier at meeting time.

The operations included in process 900 are for illustration purposes. Binding separate communication platform meetings may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

Examples

Example 1 is a method, performed by a data processing system for joining a first meeting hosted by a first computerized meeting service and having a first plurality of participants to a second meeting hosted by a second computerized meeting service and having a second plurality of participants the method comprising: obtaining information identifying the first and second meetings; and in response to a request from one of the first and second computerized meeting services to join the first and second meetings, translating audio, video, and data signaling between the first computerized meeting service and the second computerized meeting to join the first plurality of participants and the second plurality of participants in a combined computerized meeting.

Example 2, includes the subject matter of Example 1 wherein: the obtaining of the information identifying the first and second meetings includes: obtaining first metadata identifying a first protocol used by the first meeting for audio, video, and data signaling; and obtaining second metadata identifying a second protocol used by the second meeting for audio, video, and data signaling; and the translating of the audio, video, and data signaling between the first computerized meeting service and the second computerized meeting service includes: obtaining a first agent implementing the first protocol according to the first metadata for accessing the first meeting; and obtaining a second agent implementing the second protocol according to the second metadata for accessing the second meeting, wherein the first and second agents are configured to translate audio, video and data signaling between the first and second agents.

In Example 3, the subject matter of Example 2 includes, receiving, from the first meeting service, a request to join the first meeting and the second meeting, the request including information identifying the first meeting and the second meeting; the obtaining of the first agent includes looking up the first agent based on the information identifying the first meeting; and the obtaining of the second agent includes looking up the second agent based on the information identifying the second meeting.

Example 4 includes the subject matter of Example 3 wherein the first metadata includes the information identifying the first meeting and the second metadata includes the information identifying the second meeting.

Example 5 includes the subject matter of Examples 2-4 wherein the translating of the audio, video, and data signaling comprises using the first and second agents to translate the audio, video, and data signaling between the first computerized meeting service and the second computerized meeting service.

Example 6 includes the subject matter of Examples 2-5 wherein the translating of the audio, video, and data signaling comprises using the first and second agents to translate the audio, video, and data signaling between the first plurality of participants and the second plurality of participants.

Example 7 includes the subject matter of Examples 2-6 wherein: the first metadata identifies one or more modalities as being allowed in the first meeting and the second metadata identifies one or more of the modalities as being allowed in the second meeting, the one or more modalities including one or more of audio sharing, video sharing, messaging, or desktop sharing; and the first and second agents are configured to join at least one common modality of the first and second meetings.

Example 8 includes the subject matter of Examples 2-7 wherein one of the first and second agents includes a session initiation protocol (SIP) user agent.

Example 9 is a method, performed by a data processing system, for joining a first meeting hosted by a first computerized meeting service and having a first plurality of participants and a second meeting hosted by a second computerized meeting service and having a second plurality of participants, the method comprising: obtaining a uniform resource indicator (URI) for an agent of the first meeting on the first computerized meeting service; and in response to a request from one of the second plurality of participants to access the first meeting, providing the URI to the second computerized meeting service to allow the second computerized meeting service to join the second meeting to the first meeting and to join the first plurality of participants and the second plurality of participants in a joint meeting.

Example 10 includes the subject matter of Example 9 wherein obtaining the URI for the agent of the first meeting comprises: obtaining an identification of the first meeting; obtaining metadata for the second meeting; providing the metadata for the second meeting to the first computerized meeting service with the identification of the first meeting; and obtaining the URI for the agent of the first meeting from the first computerized meeting service.

Example 11 includes the subject matter of Example 10 wherein: the metadata for the second meeting identifies one or more modalities as being allowed in the second meeting, the one or more modalities including at least one of audio sharing, video sharing, messaging, or desktop sharing; and the URI is for an agent of the first computerized meeting service allowing at least one of the identified one or more modalities.

Example 12 includes the subject matter of Examples 10-11 wherein the metadata includes an identifier of the second computerized meeting service, an identifier of the first meeting, and a key created by the first computerized meeting service based on the identifier of the second computerized meeting service, the key identifying properties of a link to the first computerized meeting service.

Example 13 includes the subject matter of Example 12 wherein: the request from the one of the second plurality of participants includes the key; and the providing of the URI includes looking up the URI based on the key.

Example 14 includes the subject matter of Examples 12-13 wherein the URI includes the key as a part of a session initiation protocol (SIP) address for a user agent on the first computerized meeting service.

Example 15 is a system for joining a first meeting hosted by a first computerized meeting service and having a first plurality of participants and a second meeting hosted by a second computerized meeting service and having a second plurality of participants, the system comprising: one or more processors; and a memory coupled to the one or more processors, the memory storing computer executable instructions that, when executed by the one or more processors, cause the system to perform operations including: obtaining a uniform resource indicator (URI) for an agent of the first meeting on the first computerized meeting service; and in response to a request from one of the second plurality of participants to access the first meeting, providing the URI to the second computerized meeting service to allow the second computerized meeting service to join the second meeting to the first meeting and to join the first plurality of participants and the second plurality of participants in a joint meeting.

Example 16 includes the subject matter of Example 15 wherein the operation of obtaining the URI for the agent of the first meeting comprises: obtaining an identification of the first meeting; obtaining metadata for the second meeting; providing the metadata for the second meeting to the first computerized meeting service with the identification of the first meeting; and obtaining the URI for the agent of the first meeting from the first computerized meeting service.

Example 17 includes the subject matter of Example 16 wherein the metadata for the second meeting includes an identifier of the second computerized meeting service, an identifier of the first meeting, and a key created by the first computerized meeting service based on the identifier of the second computerized meeting service, the key identifying properties of a link to the first computerized meeting service.

Example 18 includes the subject matter of Example 17 wherein: the request from the one of the second plurality of participants includes the key; and the operation of providing of the URI includes looking up the URI based on the key.

Example 19 includes the subject matter of Examples 17-18 wherein the URI includes the key as a part of a session initiation protocol (SIP) address for a user agent on the first computerized meeting service.

Example 20 includes the subject matter of Examples 16-19 wherein: the metadata for the second meeting identifies one or more modalities as being allowed in the second meeting, the one or more modalities including at least one of audio sharing, video sharing, messaging, or desktop sharing; and the URI is for an agent of the first computerized meeting service allowing at least one of the identified one or more modalities.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

According to some examples, a means for binding separate communication platform meetings is described. The means may include during a provisioning phase, a means for transmitting a tenant identifier to a video conference service; a means for receiving a key created by the video conference service based on the tenant identifier; a means for creating metadata based on one or more of the key and the tenant identifier for scheduling online meetings with a video conference component; during a scheduling phase, a means for inserting the key and a conference identifier to a meeting body; and during a meeting phase, a means for allowing an online meeting component and the video conference component to be facilitated together through a first link for the online meeting component and a second link for the video conference component based on the metadata.

According to some examples, a method executed at one or more computing devices for binding separate communication platform meetings is described. The method may include during a provisioning phase, transmitting a tenant identifier to a video conference service; receiving a key created by the video conference service based on the tenant identifier; creating metadata based on one or more of the key and the tenant identifier for scheduling online meetings with a video conference component; during a scheduling phase, inserting the key and a conference identifier to a meeting body; and during a meeting phase, allowing an online meeting component and the video conference component to be facilitated together through a first link for the online meeting component and a second link for the video conference component based on the metadata.

According to other examples, the method may also include during the scheduling phase, receiving a request from a user application to schedule a meeting and providing the key and an indication to include the video conference component to the user application based on the metadata to enable insertion of the key and the conference identifier to the meeting body. The method may further include during the scheduling phase, enabling formatting of the meeting attributes and the meeting body at the user application. The second link may be a uniform resource locator link providing interconnectivity with the video conference service. The method may also include during the meeting phase, allowing a user to join a meeting through the video conference component by activating the uniform resource locator link.

According to further examples, the method may also include during the meeting phase, employing a session initiation protocol (SIP) address that includes the key as a portion of the address to access the meeting through the video conference component. The key and the tenant identifier may be received from the video conference service as a pair. A user application providing access to the meeting may be a local meeting application or a web application associated with the online meeting service. The tenant identifier may identify one of the online meeting service and a component of the online meeting service.

According to other examples, a computing device to provide binding of separate communication platform meetings is described. The computing device may include a communication interface configured to facilitate communication between the computing device and one or more servers; a memory configured to store instructions; and one or more processors coupled to the memory, where the one or more processors, in conjunction with the instructions stored in the memory, may be configured to execute an online meeting service. The online meeting service may include a provisioning service configured to during a provisioning phase, transmit a tenant identifier to a video conference service, receive a key created by the video conference service based on the tenant identifier, and create metadata based on one or more of the key and the tenant identifier for scheduling online meetings with a video conference component. The online meeting service may also include a scheduling service configured to during a scheduling phase, insert the key and a conference identifier to a meeting body. The online meeting service may further include a meeting application configured to during a meeting phase, allow an online meeting component and the video conference component of a scheduled meeting to be facilitated together through a first link for the online meeting component and a second link for the video conference component based on the metadata.

According to some examples, the meeting application may be further configured to, during the meeting phase, provide the second link to the video conference service; receive a request for the conference identifier; provide the conference identifier to the video conference service; and receive the tenant identifier and the conference identifier from the video conference service. The meeting application may also be configured to, during the meeting phase, resolve the tenant identifier and the conference identifier to determine a meeting uniform resource identifier; and provide the meeting uniform resource identifier to the video conference service to enable access to the meeting through the video conference component.

According to yet other examples, the first link may include the meeting uniform resource identifier. The second link may be a session initiation protocol (SIP) address that includes the key. The tenant identifier may uniquely identify one of the online meeting service and a component of the online meeting service, and the conference identifier may be used to identify each meeting. The meeting may include at least one video component and at least one audio component. The online meeting service may be a component of a productivity service.

According to further examples, a physical computer-readable storage medium with instruction stored thereon to provide binding of separate communication platform meetings is described. The instructions may be configured to cause actions to be performed by one or more computing devices to be performed including, during a provisioning phase, transmitting a tenant identifier to a video conference service; receiving a key created by the video conference service based on the tenant identifier; creating metadata based on one or more of the key and the tenant identifier for scheduling online meetings with a video conference component. The actions may further include, during a scheduling phase, inserting the key and a conference identifier to a meeting body; receiving a request from a user application to schedule a meeting; providing the key and an indication to include the video conference component to a user application based on the metadata to enable insertion of the key and the conference identifier to the meeting body, and, during a meeting phase, allowing an online meeting component and the video conference component to be facilitated together through a first link for the online meeting component and a second link for the video conference component based on the metadata.

According to yet further examples, the meeting may include one or more of an audio modality, a video modality, a messaging modality, an application sharing modality, and a desktop sharing modality. The tenant identifier and the key may be persisted for a plurality of meetings with the video conference component.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method, performed by a data processing system for joining a first meeting, hosted by a first computerized meeting service and having a first plurality of participants, to a second meeting, hosted by a second computerized meeting service and having a second plurality of participants, the method comprising:
    obtaining information identifying the first and second meetings; and
    in response to a request from the first computerized meeting service to join the first meeting to the second meeting, the request including a key created by the second computerized meeting service and the key identifying properties of the second meeting, wherein the key is used to generate a link associated to the second computerized meeting service, translating audio, video, and data signaling between the first computerized meeting service and the second computerized meeting to join the first plurality of participants and the second plurality of participants in a combined computerized meeting; and
    outputting the link which, when accessed by a participant of the first plurality of participants, causes the participant to access the second computerized meeting.

2. The method of claim 1, wherein:
    the obtaining of the information identifying the first and second meetings includes:
    obtaining first metadata identifying a first protocol used by the first meeting for audio, video, and data signaling; and
    obtaining second metadata identifying a second protocol used by the second meeting for audio, video, and data signaling; and
    the translating of the audio, video, and data signaling between the first computerized meeting service and the second computerized meeting service includes:
    obtaining a first agent implementing the first protocol according to the first metadata for accessing the first meeting; and
    obtaining a second agent implementing the second protocol according to the second metadata for accessing the second meeting, wherein the first and second agents are configured to translate audio, video and data signaling between the first and second agents.

3. The method of claim 2, further comprising:
    receiving, from the first meeting service, a request to join the first meeting to the second meeting, the request including information identifying the first meeting and the second meeting;
    the obtaining of the first agent includes looking up the first agent based on the information identifying the first meeting; and
    the obtaining of the second agent includes looking up the second agent based on the information identifying the second meeting.

4. The method of claim 3, wherein the first metadata includes the information identifying the first meeting and the second metadata includes the information identifying the second meeting.

5. The method of claim 2, wherein the translating of the audio, video, and data signaling comprises using the first and second agents to translate the audio, video, and data signaling between the first computerized meeting service and the second computerized meeting service.

6. The method of claim 2, wherein the translating of the audio, video, and data signaling comprises using the first and second agents to translate the audio, video, and data signaling between the first plurality of participants and the second plurality of participants.

7. The method of claim 2, wherein:
    the first metadata identifies one or more modalities as being allowed in the first meeting and the second metadata identifies one or more of the modalities as being allowed in the second meeting, the one or more modalities including one or more of audio sharing, video sharing, messaging, or desktop sharing; and
    the first and second agents are configured to join at least one common modality of the first and second meetings.

8. The method of claim 2, wherein one of the first and second agents includes a session initiation protocol (SIP) user agent.

9. A method, performed by a data processing system, for joining a first meeting, hosted by a first computerized meeting service and having a first plurality of participants, to a second meeting, hosted by a second computerized meeting service and having a second plurality of participants, the method comprising:

obtaining a uniform resource indicator (URI) for an agent of the first meeting on the first computerized meeting service; and in response to a request from one of the first plurality of participants to join the first meeting to the second meeting, the request including a key created by the second computerized meeting service and the key identifying properties of the second meeting, wherein the key is used to generate a link associated to the second computerized meeting service; providing the URI to the second computerized meeting service to allow the second computerized meeting service to join the second meeting to the first meeting and to join the first plurality of participants and the second plurality of participants in a joint meeting; and outputting the link, which, when accessed by the one of the first plurality of participants, causes the one of the first plurality of participants to access the second computerized meeting.

10. The method of claim 9, wherein obtaining the URI for the agent of the first meeting comprises:

obtaining an identification of the first meeting;
obtaining metadata for the second meeting;
providing the metadata for the second meeting to the first computerized meeting service with the identification of the first meeting; and
obtaining the URI for the agent of the first meeting from the first computerized meeting service.

11. The method of claim 10, wherein:
the metadata for the second meeting identifies one or more modalities as being allowed in the second meeting, the one or more modalities including at least one of audio sharing, video sharing, messaging, or desktop sharing; and
the URI is for an agent of the first computerized meeting service allowing at least one of the identified one or more modalities.

12. The method of claim 10, wherein the metadata includes an identifier of the second computerized meeting service, an identifier of the first meeting, and a key created by the first computerized meeting service based on the identifier of the second computerized meeting service, the key identifying properties of a link to the first computerized meeting service.

13. The method of claim 12, wherein:
the request from the one of the second plurality of participants includes the key; and
the providing of the URI includes looking up the URI based on the key.

14. The method of claim 12, wherein the URI includes the key as a part of a session initiation protocol (SIP) address for a user agent on the first computerized meeting service.

15. A system for joining a first meeting, hosted by a first computerized meeting service and having a first plurality of participants, to a second meeting, hosted by a second computerized meeting service and having a second plurality of participants, the system comprising:

one or more processors; and
a memory coupled to the one or more processors, the memory storing computer executable instructions that, when executed by the one or more processors, cause the system to perform operations including:
obtaining a uniform resource indicator (URI) for an agent of the first meeting on the first computerized meeting service; and
in response to a request from one of the first plurality of participants to join the first meeting to the second meeting the request including a key created by the second computerized meeting service and the key identifying properties of the second meeting, wherein the key is used to generate a link associated to the second computerized meeting service, providing the URI to the second computerized meeting service to allow the second computerized meeting service to join the second meeting to the first meeting and to join the first plurality of participants and the second plurality of participants in a joint meeting; and
outputting the link, which, when accessed by the one of the first plurality of participants, causes the one of the first plurality of participants to access the second computerized meeting.

16. The system of claim 15, wherein the operation of obtaining the URI for the agent of the first meeting comprises:

obtaining an identification of the first meeting;
obtaining metadata for the second meeting;
providing the metadata for the second meeting to the first computerized meeting service with the identification of the first meeting; and
obtaining the URI for the agent of the first meeting from the first computerized meeting service.

17. The system of claim 16, wherein the metadata for the second meeting includes an identifier of the second computerized meeting service, an identifier of the first meeting, and a key created by the first computerized meeting service based on the identifier of the second computerized meeting service, the key identifying properties of a link to the first computerized meeting service.

18. The system of claim 17, wherein:
the request from the one of the second plurality of participants includes the key; and
the operation of providing of the URI includes looking up the URI based on the key.

19. The system of claim 17, wherein the URI includes the key as a part of a session initiation protocol (SIP) address for a user agent on the first computerized meeting service.

20. The system of claim 16, wherein:
the metadata for the second meeting identities one or more modalities as being allowed in the second meeting, the one or more modalities including at least one of audio sharing, video sharing, messaging, or desktop sharing; and
the URI is for an agent of the first computerized meeting service allowing at least one of the identified one or more modalities.

* * * * *